US012774231B2

(12) United States Patent
Yui et al.

(10) Patent No.: US 12,774,231 B2
(45) Date of Patent: Oct. 27, 2026

(54) PURE WATER PRODUCTION APPARATUS

(71) Applicant: ORGANO CORPORATION, Tokyo (JP)

(72) Inventors: Hironori Yui, Tokyo (JP); Kenta Suga, Tokyo (JP); Issei Yoshida, Tokyo (JP); Fumio Sudo, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 359 days.

(21) Appl. No.: 18/564,782

(22) PCT Filed: Jan. 21, 2022

(86) PCT No.: PCT/JP2022/002121

§ 371 (c)(1),
(2) Date: Nov. 28, 2023

(87) PCT Pub. No.: WO2022/259599

PCT Pub. Date: Dec. 15, 2022

(65) Prior Publication Data

US 2024/0279091 A1 Aug. 22, 2024

(30) Foreign Application Priority Data

Jun. 7, 2021 (JP) ................................ 2021-095335

(51) Int. Cl.
*C02F 1/76* (2023.01)
*C02F 1/70* (2023.01)
(Continued)

(52) U.S. Cl.
CPC ................ *C02F 1/766* (2013.01); *C02F 1/70* (2013.01); *C02F 3/106* (2013.01);
(Continued)

(58) Field of Classification Search
CPC .. C02F 1/766; C02F 1/70; C02F 3/106; C02F 2003/003; C02F 2101/34; C02F 2101/38;
(Continued)

(56) References Cited

U.S. PATENT DOCUMENTS

2010/0187175 A1 7/2010 Kolios et al.
2013/0048558 A1 2/2013 Arai et al.

FOREIGN PATENT DOCUMENTS

CN 101720307 A 6/2010
JP 11-47770 A 2/1999
(Continued)

OTHER PUBLICATIONS

International Search Report issued Mar. 29, 2022 in International Bureau of WIPO Patent Application No. PCT/JP2022/002121 with an English translation thereof.
(Continued)

*Primary Examiner* — Hayden Brewster
(74) *Attorney, Agent, or Firm* — Greenblum & Bernstein, P.L.C.

(57) ABSTRACT

The purpose is to provide a pure water production method and apparatus, which make it possible to prevent the increase in an ion load during a pure water production process, improve the efficiency of a biological treatment and reduce the generation amount of pulverized coal in a method for treating oxidation-treated water in which urea is oxidized and decomposed with a hypohalous acid with biological activated carbon. Provided is a pure water production method including: for adding a hypohalous acid to urea-containing water of interest and performing an oxidation treatment of the urea in an oxidation treatment apparatus; and measuring the concentration of residual chlorine in the oxidation-treated water, then adding hydrogen peroxide to the oxidation-treated water depending on the measured
(Continued)

concentration of the residual chlorine, and then performing a biological treatment of the hydrogen peroxide-added water with biological activated carbon in a biological treatment apparatus.

3 Claims, 3 Drawing Sheets

(51) Int. Cl.

| | |
|---|---|
| ***C02F 3/00*** | (2023.01) |
| ***C02F 3/10*** | (2023.01) |
| ***C02F 101/34*** | (2006.01) |
| *C02F 101/38* | (2006.01) |

(52) U.S. Cl.

CPC .... *C02F 2003/003* (2013.01); *C02F 2101/34* (2013.01); *C02F 2101/38* (2013.01); *C02F 2209/22* (2013.01); *C02F 2303/185* (2013.01)

(58) Field of Classification Search

CPC ............ C02F 2209/22; C02F 2303/185; C02F 2209/04; C02F 1/722; C02F 3/34; C02F 2209/29; C02F 1/283; C02F 3/06; C02F 1/76; C02F 3/10; Y02W 10/10

USPC .......................................................... 210/754

See application file for complete search history.

(56) References Cited

FOREIGN PATENT DOCUMENTS

| | | | |
|---|---|---|---|
| JP | 2000-288578 | A | 10/2000 |
| JP | 2010-531724 | A | 9/2010 |
| JP | 2011-183275 | A | 9/2011 |
| JP | 2012-11356 | A | 1/2012 |
| SG | 157801 | A1 | 1/2010 |

OTHER PUBLICATIONS

Written Opinion issued Mar. 29, 2022 in International Bureau of WIPO Patent Application No. PCT/JP2022/002121 with an English translation thereof.

Office Action, dated Dec. 22, 2025, in Chinese family member application No. 202280038359.0, with English language translation thereof.

Office Action, dated Jun. 30, 2025, issued in Chinese family member application No. 202280038359.0, with English language translation thereof.

Office Action, dated May 13, 2025, issued in Japanese family member application No. 2021-095335, With English language translation thereof.

International Preliminary Report on Patentability issued Nov. 21, 2023 in International Bureau of WIPO Patent Application No. PCT/JP2022/002121 with an English translation thereof.

Office Action, dated Apr. 24, 2026, that issued in corresponding Chinese Application No. 202280038359.0, with English language translation thereof.

PURE WATER PRODUCTION APPARATUS

CROSS REFERENCE TO RELATED APPLICATION

This application is a National Stage of International Application No. PCT/JP2022/002121 filed on Jan. 21, 2022, which claims priority to Japanese Patent Application No. 2021-095335 filed on Jun. 7, 2021, the contents of each of the above-identified applications are incorporated herein by reference in their entirety including the specifications, claims, drawings, and abstracts.

TECHNICAL FIELD

The present invention relates to a pure water production method and a pure water production apparatus for producing pure water, and relates particularly to a pure water production method and pure water production apparatus that can remove urea.

BACKGROUND

Conventionally, the wash water used in production steps for semiconductor devices and production steps for liquid crystal display devices and the like has employed pure water such as ultrapure water from which organic substances, ionic components, microparticles and bacteria and the like have been removed to a very high degree. In particular, during the production of electronic components containing semiconductor devices, large amounts of pure water are used in the washing steps, and the requirements relating to the quality of the water grow more demanding every year. In the case of the pure water used in the washing steps and the like during the production of electronic components, in order to inhibit organic substances contained in the pure water from carbonizing in subsequent heat treatment steps and causing insulation faults and the like, it is now a requirement that the total organic carbon (TOC) concentration, which represents one item in water quality control, is reduced to an extremely low level, and urea is an organic substance of particular interest.

One known method for cheaply and efficiently treating urea is a method in which a treated water that has been subjected to an oxidative decomposition treatment using hypobromous acid produced from a bromide salt such as sodium bromide and an oxidizing agent such as sodium hypochlorite is treated using biological activated carbon (see Patent Document 1). The method of Patent Document 1 has an object of achieving a stable treatment for urea by combining a physiochemical treatment and a biological treatment, but some residual oxidizing agent from the oxidative decomposition treatment may sometimes flow into the biological activated carbon. The oxidizing agent is removed by the activated carbon, but there remain concerns relating to the effects of the oxidizing agent on the biological treatment performance, and the effects of the generation of powdered carbon on subsequent treatments. Further, although the above effects can be moderated by adding a reducing agent prior to the biological treatment, depending on the type of reducing agent used, there is a possibility of increased treatment costs associated with an increase in the ionic load in subsequent pure water production processes, and a reduction in treatment efficiency.

CITATION LIST

Patent Literature

Patent Document 1: JP 2011-183275 A

SUMMARY

Technical Problem

Objects of the present invention are to provide a pure water production method and a pure water production apparatus which, in a method for treating, with a biological activated carbon, an oxidation treated water in which urea has been subjected to an oxidative decomposition treatment with a hypohalous acid, enable suppression of any increase in the ionic load during the pure water production process, improve the efficiency of the biological treatment, and can moderate the amount of powdered carbon generated.

Solution to Problem

The present invention provides a pure water production method that includes an oxidation treatment step of adding a hypohalous acid to a water to be treated containing urea to conduct an oxidation treatment of the urea, a hydrogen peroxide addition step of measuring the residual chlorine concentration of the oxidation treated water obtained in the oxidation treatment step and then adding hydrogen peroxide to the oxidation treated water in accordance with the measured residual chlorine concentration, and a biological treatment step of subjecting the hydrogen peroxide-added water containing the added hydrogen peroxide to a biological treatment with a biological activated carbon.

In the pure water production method described above, it is preferable that the biological treatment step uses a plurality of activated carbon columns packed with a biological activated carbon on which microorganisms have been supported, with this plurality of activated carbon columns being arranged in parallel.

In the pure water production method described above, the hypohalous acid is preferably hypobromous acid.

In the pure water production method described above, the hydrogen peroxide addition step preferably includes a first hydrogen peroxide addition step of measuring a first residual chlorine concentration for the oxidation treated water at a position close to the oxidation treatment step, and adding hydrogen peroxide to the oxidation treated water in accordance with the measured first residual chlorine concentration, and a second hydrogen peroxide addition step of measuring a second residual chlorine concentration for the oxidation treated water at a position close to the biological treatment step, and adding hydrogen peroxide to the oxidation treated water in accordance with the measured second residual chlorine concentration.

In the pure water production method described above, it is preferable that the dissolved oxygen concentration of the hydrogen peroxide-added water or the biologically treated water obtained in the biological treatment step is measured, with a supplementary addition of hydrogen peroxide to the oxidation treated water then performed in accordance with the measured dissolved oxygen concentration.

The present invention also provides a pure water production apparatus that includes an oxidation treatment unit which adds a hypohalous acid to a water to be treated containing urea to conduct an oxidation treatment of the urea, a residual chlorine concentration measurement unit which measures the residual chlorine concentration of the oxidation treated water obtained in the oxidation treatment unit, a hydrogen peroxide addition unit which adds hydrogen peroxide to the oxidation treated water in accordance with the residual chlorine concentration measured by the residual chlorine concentration measurement unit, and a biological treatment unit which subjects the hydrogen peroxide-added water containing the added hydrogen peroxide to a biological treatment with a biological activated carbon.

In the pure water production apparatus described above, it is preferable that the biological treatment unit includes a plurality of activated carbon columns packed with a biological activated carbon on which microorganisms have been supported, with this plurality of activated carbon columns being arranged in parallel.

In the pure water production apparatus described above, the hypohalous acid is preferably hypobromous acid.

In the pure water production apparatus described above, it is preferable that the residual chlorine concentration measurement unit includes a first residual chlorine concentration measurement unit which measures a first residual chlorine concentration of the oxidation treated water at a position close to the oxidation treatment unit, and a second residual chlorine concentration measurement unit which measures a second residual chlorine concentration of the oxidation treated water at a position close to the biological treatment unit, and that the hydrogen peroxide addition unit includes a first hydrogen peroxide addition unit which adds hydrogen peroxide to the oxidation treated water in accordance with the first residual chlorine concentration measured by the first residual chlorine concentration measurement unit, and a second hydrogen peroxide addition unit which adds hydrogen peroxide to the oxidation treated water in accordance with the second residual chlorine concentration measured by the second residual chlorine concentration measurement unit.

The pure water production apparatus described above preferably also includes a dissolved oxygen concentration measurement unit which measures the dissolved oxygen concentration of the hydrogen peroxide-added water or the biologically treated water obtained in the biological treatment unit, and the hydrogen peroxide addition unit preferably performs a supplementary addition of hydrogen peroxide to the oxidation treated water in accordance with the measured dissolved oxygen concentration.

Advantageous Effects of Invention

The present invention is able to provide a pure water production method and a pure water production apparatus which, in a method for treating, with a biological activated carbon, an oxidation treated water in which urea has been subjected to an oxidative decomposition treatment with a hypohalous acid, enable suppression of any increase in the ionic load during the pure water production process, improve the efficiency of the biological treatment, and can moderate the amount of powdered carbon generated.

DESCRIPTION OF EMBODIMENTS

Embodiments of the present invention are described below. These embodiments are merely examples of implementing the present invention, and the present invention is not limited to these embodiments.

Figure 1:
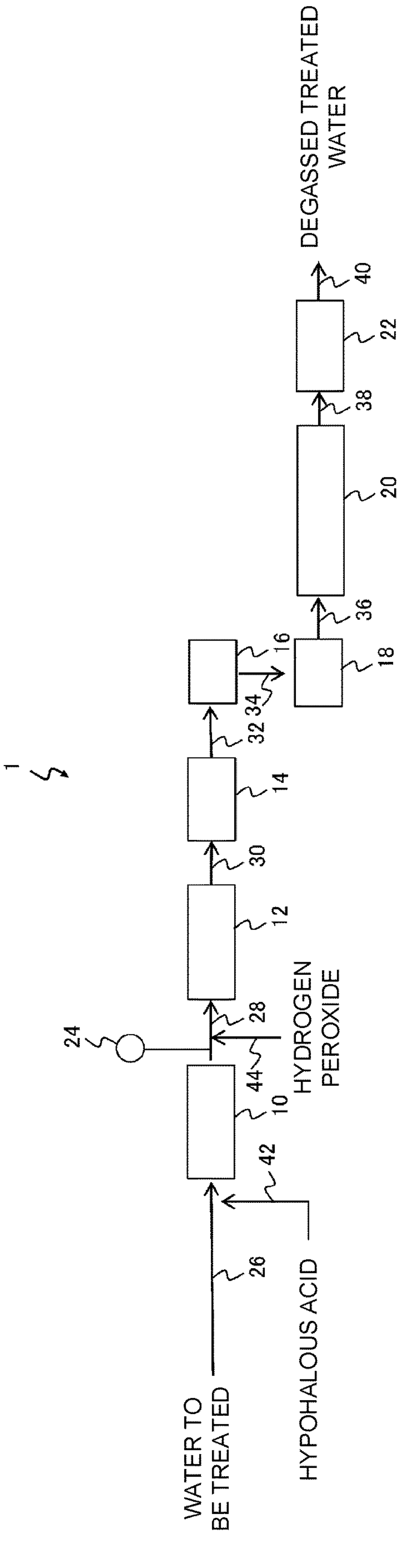
FIG. 1 is a schematic structural diagram illustrating one example of the pure water production apparatus according to an embodiment of the present invention.

An outline of one example of the pure water production apparatus according to an embodiment of the present invention is illustrated in FIG. 1, and the structure of that apparatus is described below.

The pure water production apparatus 1 illustrated in FIG. 1 includes an oxidation treatment device 10 and a hypohalous acid addition line 42 as the oxidation treatment unit which adds a hypohalous acid to a water to be treated containing urea to conduct an oxidation treatment of the urea, a residual chlorine concentration measurement device 24 as the residual chlorine concentration measurement unit which measures the residual chlorine concentration of the oxidation treated water obtained in the oxidation treatment device 10, a hydrogen peroxide addition line 44 as the hydrogen peroxide addition unit which adds hydrogen peroxide to the oxidation treated water in accordance with the residual chlorine concentration measured by the residual chlorine concentration measurement device 24, and a biological treatment device 12 as the biological treatment unit which subjects the hydrogen peroxide-added water containing the added hydrogen peroxide to a biological treatment with a biological activated carbon.

The pure water production apparatus 1 may also include a first ion exchange treatment device 14 as a first ion exchange treatment unit which subjects the biologically treated water obtained in the biological treatment device 12 to a first ion exchange treatment, a reverse osmosis membrane treatment device 16 as a reverse osmosis membrane treatment unit which subjects the first ion exchange treated water obtained in the first ion exchange treatment device 14 to a reverse osmosis membrane treatment to obtain an RO permeate and an RO concentrate, an ultraviolet irradiation treatment device 18 as an ultraviolet irradiation treatment unit which subjects the RO permeate obtained in the reverse osmosis membrane treatment device 16 to an ultraviolet irradiation treatment (an ultraviolet oxidation treatment), a second ion exchange treatment device 20 as a second ion exchange treatment unit which subjects the ultraviolet irradiation treated water obtained in the ultraviolet irradiation treatment device 18 to a second ion exchange treatment, and a degassing treatment device 22 which subjects the second ion exchange treated water obtained in the second ion exchange treatment device 20 to a degassing treatment. A filtration device (not shown in the drawing) may also be provided as a filtration unit which filters the water to be treated upstream from the biological treatment device 12.

In the pure water production apparatus 1 of FIG. 1, a line 26 is connected to an inlet of the oxidation treatment device 10. An outlet of the oxidation treatment device 10 and an inlet of the biological treatment device 12 are connected by a line 28. An outlet of the biological treatment device 12 and an inlet of the first ion exchange treatment device 14 are connected by a line 30. An outlet of the first ion exchange treatment device 14 and an inlet of the reverse osmosis membrane treatment device 16 are connected by a line 32. The RO permeate outlet of the reverse osmosis membrane treatment device 16 and an inlet of the ultraviolet irradiation treatment device 18 are connected by a line 34. An outlet of the ultraviolet irradiation treatment device 18 and an inlet of the second ion exchange treatment device 20 are connected by a line 36. An outlet of the second ion exchange treatment device 20 and an inlet of the degassing treatment device 22 are connected by a line 38. A line 40 is connected to an outlet of the degassing treatment device 22. A hypohalous acid addition line 42 is connected to the line 26. A residual chlorine concentration measurement device 24 is installed within the line 28, and a hydrogen peroxide addition line 44 is connected to the line 28 at a position downstream from the residual chlorine concentration measurement device 24.

Operations of the pure water production method and the pure water production apparatus 1 according to this embodiment are described below.

The pure water production apparatus 1 (the primary system) constitutes an ultrapure water production system in combination with an upstream pretreatment system and a downstream subsystem (the secondary system). The raw water produced in the pretreatment system (hereinafter referred to as the "water to be treated") contains organic substances including urea.

The water to be treated containing urea is pressurize using a pump (not shown in the drawing), and is passed through the line 26 and fed into the oxidation treatment device 10. At this time, a hypohalous acid is added to the water to be treated in the line 26 through the hypohalous acid addition line 42 (the hypohalous acid addition step). In the oxidation treatment device 10, the water to be treated is subjected to an oxidation treatment using the hypohalous acid (the oxidation treatment step). As a result of this oxidation treatment, the urea and the like in the water to be treated is oxidized and decomposed.

The oxidation treated water obtained in the oxidation treatment device 10 is passed through the line 28 and fed into the biological treatment device 12. At this time, the residual chlorine concentration of the oxidation treated water in the line 28 is measured by the residual chlorine concentration measurement device 24 (the residual chlorine concentration measurement step), and hydrogen peroxide is added to the oxidation treated water through the hydrogen peroxide addition line 44 in accordance with the measured residual chlorine concentration (the hydrogen peroxide addition step). Any residual hypohalous acid in the oxidation treated water is reduced by the hydrogen peroxide.

In the biological treatment device 12, the hydrogen peroxide-added water containing the added hydrogen peroxide is subjected to a biological treatment using biological activated carbon (the biological treatment step). As a result of the biological treatment, high-molecular weight organic substances and the like in the hydrogen peroxide-added water are removed. The biologically treated water that has undergone the biological treatment is passed through the line 30 and fed into the first ion exchange treatment device 14.

In the first ion exchange treatment device 14, the biologically treated water is subjected to a first ion exchange treatment (the first ion exchange treatment step). The first ion exchange treatment device 14 has, for example, a cation column (not shown in the drawing) packed with a cation exchange resin, a decarbonation column (not shown in the drawing), and an anion column (not shown in the drawing) packed with an anion exchange resin, wherein these columns are disposed in series in this order from the upstream side toward the downstream side. As a result of the first ion exchange treatment, the biologically treated water undergoes removal of cationic components in the cation column, removal of carbonic acid in the decarbonation column, and removal of anionic components in the anion column. The first ion exchanged treated water that has undergone the first ion exchange treatment is passed through the line 32 and fed into the reverse osmosis membrane treatment device 16.

In the reverse osmosis membrane treatment device 16, the first ion exchange treated water is subjected to a reverse osmosis membrane treatment to obtain an RO permeate and an RO concentrate (the reverse osmosis membrane treatment step). As a result of this reverse osmosis membrane treatment, ionic components and the like in the first ion exchange treated water are removed. The RO permeate obtained in the reverse osmosis membrane treatment is passed through the line 34 and fed into the ultraviolet irradiation treatment device 18.

In the ultraviolet irradiation treatment device 18, the RO permeate is subjected to an ultraviolet irradiation treatment (the ultraviolet irradiation treatment step). The ultraviolet irradiation treatment device 18 includes, for example, a stainless steel reaction tank and a tube-like ultraviolet lamp installed inside the reaction tank. Examples of ultraviolet lamps that may be used include ultraviolet lamps that emit ultraviolet radiation that includes at least one wavelength of 254 nm and 185 nm, a low-pressure ultraviolet lamps that emit ultraviolet radiation having each of the wavelengths of 254 nm, 194 nm and 185 nm. As a result of the ultraviolet irradiation treatment, the TOC (total organic carbon) components and the like in the RO permeate are decomposed. The ultraviolet irradiation treated water obtained in the ultraviolet irradiation treatment is passed through the line 36 and fed into the second ion exchange treatment device 20.

In the second ion exchange treatment device 20, the ultraviolet irradiation treated water is subjected to a second ion exchange treatment (the second ion exchange treatment step). The second ion exchange treatment device 20 is, for example, a regenerated ion exchange resin column packed with an anion exchange resin and a cation exchange resin. Decomposition products of organic substances and the like (such as carbon dioxide and organic acids) that have been generated in the ultraviolet irradiation treated water by the ultraviolet irradiation treatment are removed by the second ion exchange treatment device. The second ion exchange treated water that has undergone the second ion exchange treatment is passed through the line 38 and fed into the degassing treatment device 22.

In the degassing treatment device 22, the second ion exchange treated water is subjected to a degassing treatment (the degassing treatment step). As a result of the degassing treatment, dissolved oxygen and the like in the second ion exchange treated water is removed. The degassed treated water that has undergone the degassing treatment is passed through the line 40 and fed into the next step (for example, the subsystem (secondary system)).

In the pure water production method and the pure water production apparatus according to this embodiment, by providing, in a method for treating, with a biological activated carbon, an oxidation treated water in which urea has been subjected to an oxidative decomposition treatment with a hypohalous acid, a step of adding hydrogen peroxide to the oxidation treated water to reduce the hypohalous acid prior to conducting the biological treatment, any increase in the ionic load during the pure water production process can be suppressed, the efficiency of the biological treatment can be improved, and the amount of powdered carbon generated can be moderated.

By conducting an oxidative decomposition treatment with a hypohalous acid to treat urea, and then subjecting any residual hypohalous acid to a reduction treatment using hydrogen peroxide, retention of the oxidizing agent can be suppressed. In the oxidative decomposition treatment, some outflow of residual halogen is required from the viewpoint of treatment efficiency, and because this residual halogen has a higher oxidation-reduction potential than hydrogen peroxide, the hydrogen peroxide functions as a reducing agent. Examples of other possible reducing agents besides hydrogen peroxide include sodium sulfite and sodium bisulfite, but with these may cause an increase in ionic load in downstream treatments.

For example, the reduction reaction between sodium sulfite and hydrogen peroxide is represented by the equation below.

$$NaClO + H_2O_2 \longrightarrow NaCl + H_2O + O_2$$

Residual hydrogen peroxide is decomposed by the reduction reaction represented by the equation shown below through contact with the activated carbon in the subsequent biological treatment step.

$$2H_2O_2 \longrightarrow 2H_2O + O_2$$

The amount added of the hydrogen peroxide may be determined in accordance with the residual chlorine concentration from the hypohalous acid. The residual chlorine can be measured with the residual chlorine concentration measurement device 24.

Further, by conducting a reduction treatment with hydrogen peroxide, corrosion of metals and the like by residual hypohalous acid can also be suppressed.

In the biological treatment, by suppressing the inflow of the hypohalous acid that acts as an oxidizing agent, the treatment performance relative to residual urea can be improved. Urea is organic nitrogen, and in the biological treatment step, for example in the case of nitrifying bacteria, the urea is decomposed into ammonia and carbon dioxide by a decomposition enzyme, and the ammonia is further decomposed into nitrous acid and nitric acid. In the case of heterotrophic bacteria, during the organic substance decomposition process, urea is decomposed into ammonia, which is then utilized in microbial synthesis. If the hypohalous acid that acts as an oxidizing agent exists during the biological treatment step, then microbial activity decreases, and the treatment performance of the biological treatment deteriorates.

Hydrogen peroxide has a lower oxidation-reduction potential than the residual oxidizing agent retained after the oxidative decomposition treatment with hypohalous acid, and the added hydrogen peroxide is consumed by the oxidizing agent, and therefore the effect of the hydrogen peroxide on the activated carbon in the biological treatment step is minor, and the amount of powdered carbon generated can be suppressed. Powdered carbon can cause blockages in downstream treatments such as the reverse osmosis membrane treatment, and therefore the addition of hydrogen peroxide can also contribute to the suppression of fouling.

Oxygen is necessary in the biological treatment, and in those cases where the oxygen concentration is low following the oxidation treatment, the oxygen produced in the reaction between hydrogen peroxide and the activated carbon can be utilized in the biological treatment. By confirming the DO (dissolved oxygen) concentration consumed by the biological treatment in advance, a threshold for the DO concentration can be determined. For example, in the case where the DO concentration of the oxidation treated water is 2 mg/L and the DO concentration of the biologically treated water is 1 mg/L, 1 mg/L of DO is consumed in the biological treatment, and therefore if the oxidation treated water has a DO concentration of 1 mg/L or less, the deficiency can be supplemented by the addition of hydrogen peroxide. A DO meter may be used to enable monitoring of the DO concentration. Alternatively, the DO concentration following the biological treatment may be monitored, and the amount of hydrogen peroxide added then adjusted to ensure that the DO concentration is maintained at or above a prescribed value.

[Hypohalous Acid]

Examples of the hypohalous acid include hypobromous acid, hypochlorous acid and hypoiodous acid, and from the viewpoint of the urea removal performance and the like, hypobromous acid is preferred. The hypohalous acid addition unit has, for example, a sodium bromide (NaBr) storage tank (a sodium bromide supply unit), a sodium hypochlorite (NaClO) storage tank (a sodium hypochlorite supply unit), a sodium bromide and sodium hypochlorite stirred tank (a sodium bromide and sodium hypochlorite mixing unit), and a feed pump. Because long-term storage of hypobromous acid is difficult, the hypobromous acid is typically produced at the time of use by mixing the sodium bromide and sodium hypochlorite. For example, the hypobromous acid produced in the stirred tank (mixing unit) is pressurized by the feed pump and added to the water to be treated passing through the line 26 leading to the oxidation treatment. The sodium bromide and sodium hypochlorite may also be added directly to the line 26, and then mixed together within the flow of the water to be treated through the line 26 to produce the hypobromous acid.

[Hydrogen Peroxide]

The hydrogen peroxide addition unit has, for example, a hydrogen peroxide storage tank and a feed pump. For example, the hydrogen peroxide is pressurized by the feed pump and added to the oxidation treated water flowing through the line 28 between the oxidation treatment and the biological treatment. A reduction tank (not shown in the drawing) may be provided after the hydrogen peroxide addition, or the hydrogen peroxide may be supplied directly to the line 28 and mixed within the flow of the oxidation treated water in the line 28, thereby reducing the oxidizing agent.

The amount added of the hydrogen peroxide may be determined in accordance with the residual chlorine concentration that indicates the oxidizing agent. The residual chlorine can be measured with the residual chlorine concentration measurement device 24.

Because DO supply is also possible at the time of the biological treatment, a DO meter may be installed either before or after the biological treatment, with the amount added of the hydrogen peroxide then controlled in accordance with both the value from the residual chlorine concentration measurement device 24 and the DO concentration. A pure water production apparatus having this type of configuration is illustrated in FIG. 2.

Figure 2:
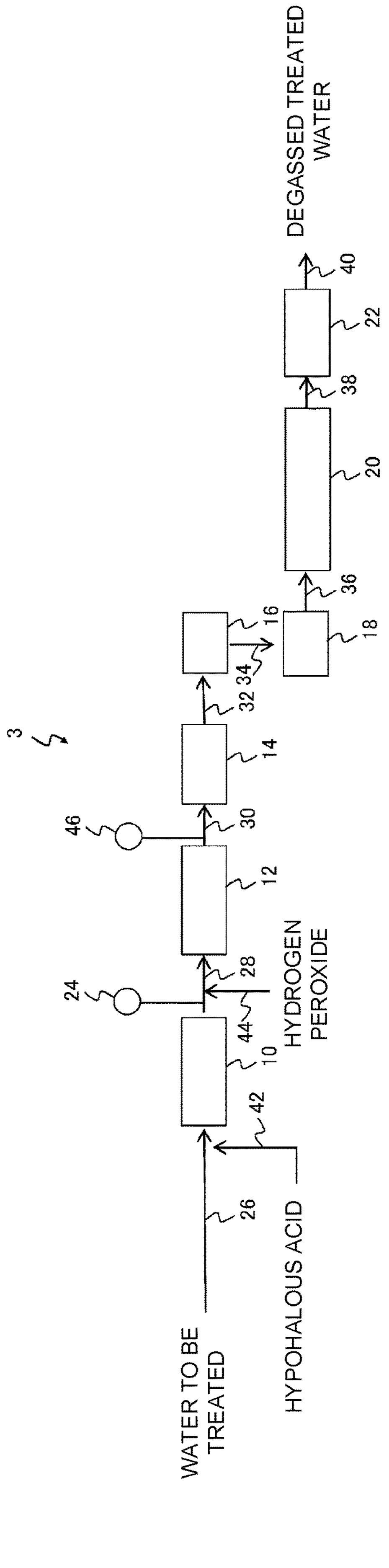
FIG. 2 is a schematic structural diagram illustrating another example of the pure water production apparatus according to an embodiment of the present invention.

The pure water production apparatus 3 illustrated in FIG. 2 has the same configuration as the pure water production apparatus 1 illustrated in FIG. 1, and is also provided with a dissolved oxygen concentration measurement device 46 as a dissolved oxygen concentration measurement unit which measures either the dissolved oxygen concentration of the hydrogen peroxide-added water or the dissolved oxygen concentration of the biologically treated water obtained in the biological treatment device 12. In the pure water production apparatus 3, the dissolved oxygen concentration measurement device 46 is installed within the line 30. The dissolved oxygen concentration measurement device 46 may also be installed in the line 28 at a position downstream from the connection point for the hydrogen peroxide addition line 44.

In the pure water production apparatus 3, the residual chlorine concentration of the oxidation treated water is measured by the residual chlorine concentration measurement device 24 in the line 28 (the residual chlorine concentration measurement step), and hydrogen peroxide is added to the oxidation treated water through the hydrogen peroxide addition line 44 in accordance with the measured residual chlorine concentration (the hydrogen peroxide addition step). The residual hypohalous acid retained in the oxidation treated water is reduced by the hydrogen peroxide. The dissolved oxygen concentration of the biologically treated water obtained in the biological treatment device 12 is measured by the dissolved oxygen concentration measurement device 46 in the line 30 (the dissolved oxygen concentration measurement step), and additional hydrogen peroxide is added to the oxidation treated water through the hydrogen peroxide addition line 44 in accordance with this measured dissolved oxygen concentration (the hydrogen peroxide supplementary addition step). In other words, control may be conducted so that an amount of hydrogen peroxide sufficient to achieve reduction is added in accordance with the residual chlorine concentration, and a supplementary addition of hydrogen peroxide is then performed to maintain the DO concentration in the biological treatment device 12 at or above a prescribed value.

Because metal lines and pumps are installed between the oxidation treatment device 10 and the biological treatment device 12, reducing the oxidizing agent with hydrogen peroxide enables the effects of corrosion to be suppressed to minimal levels. The position of addition of the hydrogen peroxide may be a position close to the oxidation treatment device 10 or a position close to the biological treatment device 12.

In those cases where the hydrogen peroxide addition is conducted at a position close to the oxidation treatment device 10, and effects on the metal lines and pumps can be suppressed to minimal levels, but slime generation becomes more possible in downstream sections of the line. In those cases where the hydrogen peroxide addition is conducted at a position close to the biological treatment device 12, slime generation can be suppressed, but there is a possibility that the effects on the metal lines and pumps may increase. The installation position may be selected with due consideration of the degree of these effects.

Alternatively, it is also possible to install two residual chlorine concentration measurement devices 24, with one in a position close to the oxidation treatment device 10 and the other in a position close to the biological treatment device 12, and also install two addition positions for hydrogen peroxide located after each of the residual chlorine concentration measurement devices, enabling control of the residual chlorine concentration to the prescribed value to be performed by a two-stage injection of the hydrogen peroxide. A pure water production apparatus having this type of configuration is illustrated in FIG. 3.

Figure 3:
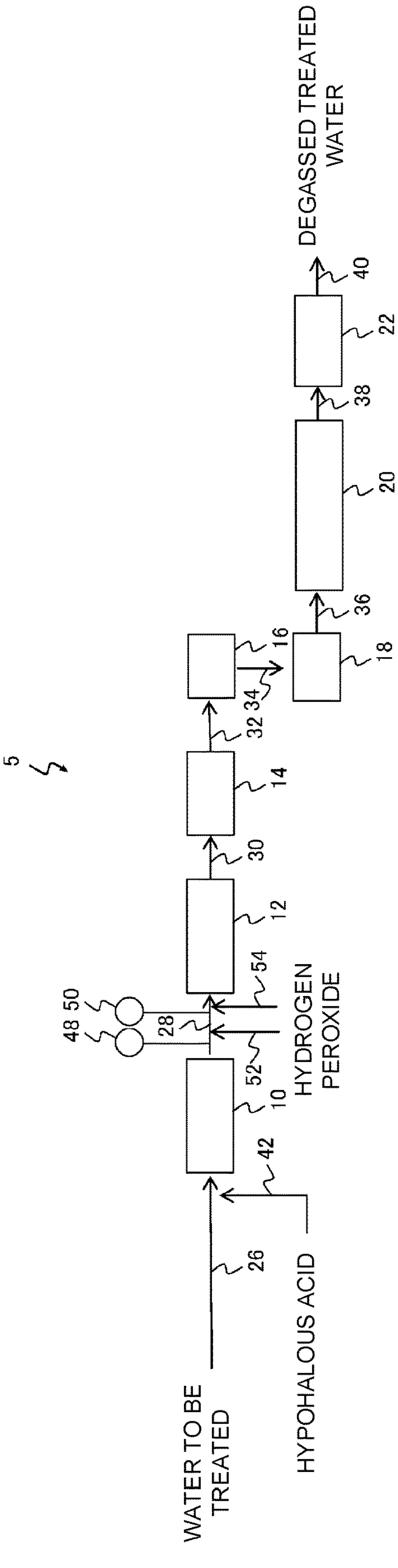
FIG. 3 is a schematic structural diagram illustrating yet another example of the pure water production apparatus according to an embodiment of the present invention.

The pure water production apparatus 5 illustrated in FIG. 3 includes, as residual chlorine concentration measurement units, a first residual chlorine concentration measurement device 48 as a first residual chlorine concentration measurement unit which measures a first residual chlorine concentration of the oxidation treated water at a position close to the oxidation treatment device 10, and a second residual chlorine concentration measurement device 50 as a second residual chlorine concentration measurement unit which measures a second residual chlorine concentration of the oxidation treated water at a position close to the biological treatment device 12. Further, the pure water production apparatus 5 also includes, as hydrogen peroxide addition units, a first hydrogen peroxide addition line 52 as a first hydrogen peroxide addition unit which adds hydrogen peroxide to the oxidation treated water in accordance with the first residual chlorine concentration measured by the first residual chlorine concentration measurement device 48, and a second hydrogen peroxide addition line 54 as a second hydrogen peroxide addition unit which adds hydrogen peroxide to the oxidation treated water in accordance with the second residual chlorine concentration measured by the second residual chlorine concentration measurement device 50. The remaining configuration is the same as that of the pure water production apparatus 1 illustrated in FIG. 1.

In the pure water production apparatus 5, the oxidation treated water obtained in the oxidation treatment device 10 is passed through the line 28 and fed into the biological treatment device 12. At this time, within the line 28, a first residual chlorine concentration of the oxidation treated water is measured by the first residual chlorine concentration measurement device 48 at a position close to the oxidation treatment device 10 (the first residual chlorine concentration measurement step), hydrogen peroxide is added to the oxidation treated water through the first hydrogen peroxide addition line 52 in accordance with the measured first residual chlorine concentration (the first hydrogen peroxide addition step), a second residual chlorine concentration of the oxidation treated water is measured by the second residual chlorine concentration measurement device 50 at a position close to the biological treatment device 12 (the second residual chlorine concentration measurement step), and hydrogen peroxide is added to the oxidation treated water through the second hydrogen peroxide addition line 54 in accordance with the measured second residual chlorine concentration (the second hydrogen peroxide addition step). Residual hypohalous acid in the oxidation treated water is reduced by the hydrogen peroxide.

By adding sufficient hydrogen peroxide at the position close to the oxidation treatment device 10 so that, for example, the residual chlorine concentration falls to 1 mg/L, and then adding supplementary hydrogen peroxide at the position close to the biological treatment device 12 so that, for example, no residual chlorine remains, a combination of suppression of corrosion of the metal lines and pumps and suppression of slime within the lines can be achieved.

The configuration described above is merely one example, and in those cases where the distance between the oxidation treatment device 10 and the biological treatment device 12 is large, the installation points and set values may be adjusted as appropriate.

[Biological Treatment Device]

The biological treatment device 12 is described below in further detail. The biological treatment device 12 has, for example, a biological activated carbon column, wherein this biological activated carbon is packed with a carrier on which microorganisms have been supported. The microorganisms may be mobile within the biological activated carbon column, but in order to suppress outflow of the microorganisms, they are preferably supported on a biological support carrier, and the use of a fixed bed system having particularly superior carrier retention is preferred. Examples of the types of carrier that may be used include plastic carriers, sponge-like carriers, gel-like carriers, zeolites, ion exchange resins and activated carbon, and the use of activated carbon, which is inexpensive, has a large specific surface area and offer superior retention, is ideal. The oxidation treated water is typically passed through the biological activated carbon column with a downward flow that results in little outflow of the microorganisms, but the oxidation treated water may also be passed through the column as an upward flow. The water flow rate supplied to the biological activated carbon column is, for example, within a range from 4 to 20 $hr^{-1}$. The water temperature of the oxidation treated water is, for example, within a range from 15 to 35° C. In those cases where the water temperature of oxidation treated water falls outside this range, a heat exchanger (not shown in the drawing) may be provided upstream from the biological activated carbon column.

There are no particular limitations on the microorganisms provided they include an enzyme having urease activity that decomposes urea, and either autotropic bacteria or heterotrophic bacteria may be used. In the case of heterotrophic bacteria, organic matter is preferably provided as a nutrition source, and therefore from the viewpoint of factors such as the effect on the water quality, the use of autotropic bacteria is preferred. Examples of preferred autotropic bacteria include nitrifying bacteria. Urea, which is a form of organic nitrogen, is decomposed into ammonia and carbon dioxide by a decomposition enzyme (urease) of the nitrifying bacteria, and the ammonia is then further decomposed into nitrous acid and nitric acid. In those cases where heterotrophic bacteria are used, urea is decomposed into ammonia by a decomposition enzyme (urease) in the same manner as nitrifying bacteria, and the produced ammonia is utilized in microbial synthesis in the process of decomposing organic substances. Commercially available microorganisms may be used, but for example, microorganisms contained within the sludge from sewage treatment plants (seed sludge) may also be used.

In the case of a fixed bed system, there is a possibility that the microorganisms may proliferate within the carrier or between particles of the carrier, thereby blocking some of the flow passages, resulting in reduced the contact efficiency between the microorganisms and the oxidation treated water, and a deterioration in the treatment performance. In order to suppress such blockages, backwashing is preferably conducted. Either the raw water supplied to the pure water production apparatus or the treated water (pure water) produced in the pure water production apparatus may be used as the backwash water. By passing the backwash water through the system in the opposite direction to the flow direction of the oxidation treated water, microorganisms that have proliferated within the carrier or between particles of the carrier can be detached by the backwashing, thereby suppressing blockages. Backwashing is typically conducted about one or two times per week, but if the blockage problems are not improved then the frequency may be increased to about once per day.

There are no particular limitations on the number of biological activated carbon columns. In terms of maintenance and the like, a plurality of biological activated carbon columns are preferably provided, with this plurality of biological activated carbon columns arranged in parallel. The activated carbon in the biological activated carbon columns is preferably replaced periodically, and the microorganisms may be re-supported when the activated carbon is replaced. Activation of the microorganisms to enable efficient removal of urea typically requires, for example, several tens of days. By conducting the activated carbon replacement and re-supporting of the microorganisms for the plurality of biological activated carbon columns in sequence, the overall urea removal rate of the biological activated carbon columns can be maintained at a prescribed level. In other words, even if the urea removal rate for one of the biological activated carbon columns is low, the urea removal rate for the other biological activated carbon columns can be maintained at a higher level, meaning the urea concentration of the treated water can be suppressed down to a prescribed level. Alternatively, when a biological activated carbon column is to undergo activated carbon replacement and re-supporting of the microorganisms, the biological activated carbon column may be isolated from the pure water production apparatus, and then re-connected to the pure water production apparatus when the urea removal rate is returned to a prescribed level. Regardless of which method is employed, continuous operation of the pure water production apparatus is possible.

EXAMPLES

The present invention is described below in further detail using an example and comparative examples, but the present invention is not limited to the following examples.

A simulated water to be treated was prepared by adding sufficient reagent-grade to pure water to achieve a urea concentration of 100 μg/L, and then adding the trace elements for a biological treatment. Hypobromous acid was selected as the hypohalous acid, and was added to this simulated water to be treated to conduct an oxidation treatment. The hypobromous acid was produced by mixing NaBr and NaClO prior to the addition.

The concentration of the hypobromous acid was measured by adding glycine to the sample water, changing the free chlorine to bound chlorine, and then performing measurement using a free chlorine reagent and a residual chlorine meter (manufactured by Hanna Instruments, Inc.). This method enables measurement of the hypobromous acid concentration. The free residual chlorine concentration was measured using the DPD method.

Specifically, 6.4 mg/L of hypobromous acid was added to the simulated water to be treated, the reaction pH was adjusted to 5.0 using dilute hydrochloric acid, and the urea treatment performance was confirmed. The reaction time was set to 10 minutes, and the urea concentration of the treated water after 10 minutes was about 30 μg/L, with the free residual chlorine concentration about 2 mg/L. The oxidation treated water following the oxidation treatment was adjusted to a pH of 7.5 using NaOH, and was then fed into a biological treatment device to evaluate the treatment performance.

The biological treatment tank used was a fixed bed system prepared by packing a 1.5 L circular cylindrical column with 1.0 L bulk volume of a particulate activated carbon (ORBEADS QHG (Organo Corporation)). First, 200 mg/L of nitrification/denitrification sludge was added, and after soaking, passage of the oxidation treated water through the column as a downward flow was commenced.

The water temperature during the test period was 20° C., and the water flow velocity was SV 5 $hr^{-1}$ (water flow rate÷activated carbon packed volume).

Backwashing was conducted with a frequency of once per three days, for a period of 10 minutes for each backwash, by passing the treated water at a linear velocity LV of 25 m/h (water flow rate÷cylindrical column cross-section area)

through the column as an upward flow. The urea concentration was measured using an ORUREA device (manufactured by Organo Corporation).

[Water Flow Conditions]

Comparative Example 1

Water flow was conducted without subjecting the oxidation treated water to a reduction treatment.

Comparative Example 2

Sodium bisulfite was added to the oxidation treated water to perform a reduction treatment as water flow was conducted. In terms of the concentration required for the reduction, the reduction treatment was conducted by injecting 6 mg/L of sodium bisulfite into the line flowing into the biological treatment device. Confirmation was made as to whether a free residual chlorine concentration could no longer be detected, and if a free residual chlorine concentration was detected, an adjustment was made and the sodium bisulfite injection volume was increased. As a result of adding sodium bisulfite, the ionic load in downstream treatments increased by a sodium sulfate fraction compared with Comparative Example 1 and Example 1.

Example 1

Hydrogen peroxide was added to the oxidation treated water to perform a reduction treatment as water flow was conducted. In terms of the concentration required for the reduction, the reduction treatment was conducted by injecting 2 mg/L of hydrogen peroxide into the line flowing into the biological treatment device. Confirmation was made as to whether a free residual chlorine concentration could no longer be detected, and if a free residual chlorine concentration was detected, an adjustment was made and the hydrogen peroxide injection volume was increased. In the case of hydrogen peroxide, oxygen was produced, but there was almost no increase in the ionic load.

[Results]

Following water flow for 50 days under each set of conditions as an acclimatization period, water quality analyses were conducted. The water quality analyses results are shown in Table 1. These results represent average values after water flow for 20 days following acclimatization.

TABLE 1

Water quality analyses results

| | Urea [μg/L] | Backwash water SS [mg/L] | DO concentration [mg/L] | DO consumption concentration [mg/L] |
|---|---|---|---|---|
| Oxidation treated water | 31 | — | 9.38 | — |
| Comparative Example 1 | 19 | 5 | 8.05 | 1.33 |
| Comparative Example 2 | 3 | 2 | 7.79 | 1.59 |
| Example | 2 | 2 | 8.23 | 1.15 |

In the case of Comparative Example 1, a urea concentration of 19 μg/L remained, but the removal performance improved in Comparative Example 2 and Example 1.

The SS concentration of the backwash water was a high value of 5 mg/L in Comparative Example 1, but the value in Example 1 was about the same as that of Comparative Example 2, confirming that production of powdered carbon was able to be suppressed.

Compared with Comparative Example 1, the DO consumption concentration increased in Comparative Example 2 due to oxygen consumption by the sodium bisulfite, but decreased in Example 1 due to the oxygen produced from the hydrogen peroxide, confirming that hydrogen peroxide addition contributed to oxygen supply.

The above results confirmed that the urea treatment performance was increased by subjecting the oxidizing agent to a reduction treatment, and that powdered carbon could also be suppressed. Further, hydrogen peroxide addition offers the advantages that, compared with sodium bisulfite, it generates almost no ionic load in downstream treatments, and also contributes to oxygen supply, and therefore hydrogen peroxide addition is preferred as the reduction treatment following the oxidation treatment.

In this manner, in a method for treating, with a biological activated carbon, an oxidation treated water in which urea had been subjected to an oxidative decomposition treatment with a hypohalous acid, any increase in the ionic load during the pure water production process was able to be suppressed, the efficiency of the biological treatment was improved, and the amount of powdered carbon generated was able to be moderated.

REFERENCE SIGNS LIST

1, 3, 5: Pure water production apparatus
10: Oxidation treatment device
12: Biological treatment device
14: First ion exchange treatment device
16: Reverse osmosis membrane treatment device
18: Ultraviolet irradiation treatment device
20: Second ion exchange treatment device
22: Degassing treatment device
24: Residual chlorine concentration measurement device
26, 28, 30, 32, 34, 36, 38, 40: Line
42: Hypohalous acid addition line
44: Hydrogen peroxide addition line
46: Dissolved oxygen concentration measurement device
48: First residual chlorine concentration measurement device
50: Second residual chlorine concentration measurement device
52: First hydrogen peroxide addition line
54: Second hydrogen peroxide addition line

The invention claimed is:

1. A pure water production apparatus comprising:

an oxidation treatment device which adds a hypohalous acid to a water to be treated containing urea to conduct an oxidation treatment of the urea, a residual chlorine concentration measurement device which measures a residual chlorine concentration of an oxidation treated water obtained in the oxidation treatment device, a hydrogen peroxide addition line which includes a hydrogen peroxide storage tank and a feed pump, and adds hydrogen peroxide to a line through which the oxidation treated water flows in accordance with the residual chlorine concentration measured by the residual chlorine concentration measurement device, a biological treatment device which subjects a hydrogen peroxide-added water containing the added hydrogen peroxide to a biological treatment with a biological activated carbon, and a dissolved oxygen concentration measurement device which measures a dissolved oxygen concentration of the hydrogen peroxide-added water or a biologically treated water obtained in the biological treatment device;

wherein the hydrogen peroxide addition line is configured to, in addition to adding hydrogen peroxide in accordance with the residual chlorine concentration, perform a supplementary addition of hydrogen peroxide to the oxidation treated water in accordance with the dissolved oxygen concentration measured by the dissolved oxygen concentration measurement device;

wherein the residual chlorine concentration measurement device comprises:

a first residual chlorine concentration measurement device which measures a first residual chlorine concentration of the oxidation treated water at a position close to the oxidation treatment device, and a second residual chlorine concentration measurement device which measures a second residual chlorine concentration of the oxidation treated water at a position close to the biological treatment device; and wherein the hydrogen peroxide addition line comprises:

a first hydrogen peroxide addition line which adds hydrogen peroxide to the oxidation treated water in accordance with the first residual chlorine concentration, and a second hydrogen peroxide addition line which adds hydrogen peroxide to the oxidation treated water in accordance with the second residual chlorine concentration.

2. The pure water production apparatus according to claim 1, wherein the biological treatment device comprises a plurality of activated carbon columns packed with a biological activated carbon on which microorganisms have been supported, with the plurality of activated carbon columns being arranged in parallel.

3. The pure water production apparatus according to claim 1, wherein the hypohalous acid is hypobromous acid.

* * * * *